United States Patent [19]

Labes et al.

[11] 4,293,193

[45] Oct. 6, 1981

[54] AMINE-SUBSTITUTED LIQUID CRYSTAL COMPOSITIONS

[75] Inventors: Mortimer M. Labes, Philadelphia; John H. MacMillan, Ambler, both of Pa.

[73] Assignee: Temple University, Philadephia, Pa.

[21] Appl. No.: 66,811

[22] Filed: Aug. 15, 1979

[51] Int. Cl.³ .......................... C09K 3/34; G02F 1/13
[52] U.S. Cl. ............... 350/350 R; 252/299.5; 252/299.63; 252/299.66; 252/408; 564/124; 564/143; 564/307; 564/338; 564/339; 564/455; 564/457; 560/24; 260/465 R
[58] Field of Search ............ 252/299, 408, 299.5, 252/299.63, 299.66; 350/350 R, 350 S; 260/563 C, 570.5 CA, 570.9, 570.5 R, 576, 578

[56] References Cited

U.S. PATENT DOCUMENTS

| | | | |
|---|---|---|---|
| 3,947,375 | 3/1976 | Gray et al. | 252/299 |
| 3,983,049 | 9/1976 | Aftergut et al. | 252/299 |
| 4,003,844 | 1/1977 | Sorkin | 252/299 |
| 4,011,173 | 3/1977 | Steinstrasser | 252/299 |
| 4,118,335 | 10/1978 | Krause et al. | 252/299 |
| 4,122,026 | 10/1978 | Osman | 252/299 |
| 4,130,502 | 12/1978 | Eidenschink et al. | 252/299 |
| 4,180,475 | 12/1979 | Schadt et al. | 252/299 |
| 4,181,625 | 1/1980 | Eidenschink et al. | 252/299 |
| 4,198,130 | 4/1980 | Boller et al. | 252/299 |
| 4,228,029 | 10/1980 | Osman | 252/299 |

*Primary Examiner*—Teddy S. Gron
*Attorney, Agent, or Firm*—Paul F. Prestia

[57] ABSTRACT

A group of novel, low temperature liquid crystalline compounds with terminal, primary or secondary amino polar electron donating groups are disclosed. These include, for example, p-alkyl-or alkoxy-phenylcyclohexanes, bicyclohexyls or biphenyl ring systems, substituted at the p' position with alkyl primary or secondary amines, of which one example is p-(4-trans-n-pentylcyclohexyl)benzylamine.

14 Claims, No Drawings

AMINE-SUBSTITUTED LIQUID CRYSTAL COMPOSITIONS

BACKGROUND OF THE INVENTION

1. Field of the Invention

This invention is concerned with a novel class of liquid crystalline amines which exhibit low temperature liquid crystalline phases.

2. Description of the Prior Art

Liquid crystals are organic compounds which exhibit certain of the properties of conventional liquids and certain of the properties of conventional crystals. Detailed discussions of the types of liquid crystalline phases and their applicability to optical display devices may be found, for example, in A. R. Kmetz, and F. K. von Willisen, editors, "Non-Emissive Electrooptic Displays", Plenum Press, New York (1976). Desirable features of liquid crystals to be used in electro-optical display devices are stability, room temperature nematic liquid crystalline phases and a wide nematic range.

It has generally been thought that amino functionalities placed at or near the end of a potential liquid crystalline molecule do not allow for the existence of liquid crystalline properties. Three exceptions to this general rule are known.

The first exception occurs when an intramolecular hydrogen bond exists in the molecule as in Formula 1 below:

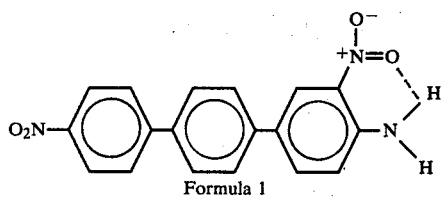

Formula 1

In contrast, intermolecular hydrogen bonding (typical of terminal amino substituted compounds) has been postulated to promote a non-linear molecular array detrimental to liquid crystalline phases.

The second exception is based on electron donation by (OH) or ($NH_2$) groups which may promote polar resonance contributors in a molecule. This increases intermolecular attractions and thus promotes a liquid crystalline phase. A molecule such as Formula 2 is capable of such resonance.

In such molecules other favorable structural factors may outweigh the possible deleterious effects of hydrogen bonding. The foregoing characterizations of the "general rule" and the exceptions thereto are based on:

P. Culling, G. W. Gray and D. Lewis, J. Chem. Soc. 2699 (1960);

D. C. Schroeder and J. P. Schroeder, J. Am. Chem. Soc. 96, 4347 (1974);

D. C. Schroeder and J. P. Schroeder, J. Org. Chem. 41, 2566 (1976);

M. J. S. Dewar and R. S. Goldberg, J. Org. Chem. 35, 2711 (1970);

"Flüssige Kristalle in Tabellen", VEB Deutscher Verlag für Grundstoffindustrie, Leipzig, 1974, pp. 88–89.

Notwithstanding the foregoing contraindications, the general objective of the present invention is to provide a low temperature liquid crystalline structure with terminal, primary or secondary amino polar electron donating groups.

A more specific object of this invention is to provide mesophasic amine terminal derivatives containing the phenylcyclohexane bicyclohexyl or biphenyl ring systems.

An additional object of this invention is to provide stable, nematic type liquid crystal compositions of increased nematic range which exhibit room temperature nematic phases. Such compositions are of use in electro-optical display devices.

BRIEF SUMMARY OF THE INVENTION

The objects of this invention are realized by a novel class of liquid crystalline amines comprising p-alkyl or alkoxy (up to 10 carbons), p'alkyl (up to 10 carbons) amine or methanamine phenylcyclohexyl, biphenyl, or bicyclohexyl ring systems. Compounds of this composition when mixed in appropriate mixture with trans-1,4-substituted cyclohexylbenzonitriles, 4-n-alkyl-(or alkoxy)-4'-cyanobiphenyls, or mixtures thereof, provide nematic liquid crystalline phases of widened mesogenic range.

DETAILED DESCRIPTION OF THE INVENTION AND PREFERRED EMBODIMENTS

The present invention comprises compounds which have low temperature liquid crystal phases and which are represented by the following formulas:

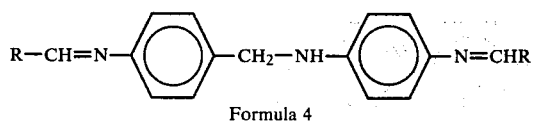

Formula 2
Y, Z = OH or $NH_2$

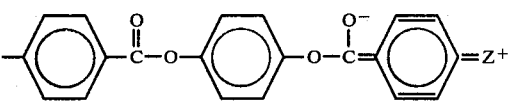

Formula 3

The third exception occurs when the amine is incorporated into a largely conjugated rodlike molecule, such as Formula 4.

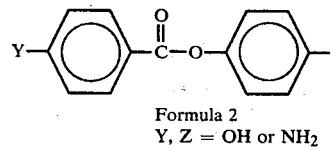

Formula 4

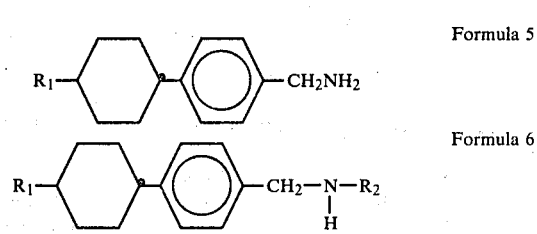

Formula 5

Formula 6

-continued

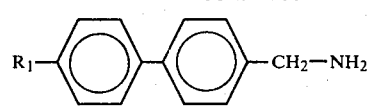

Formula 8

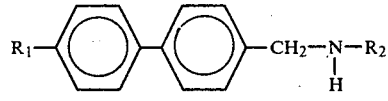

Formula 9

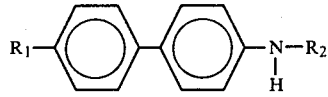

Formula 10

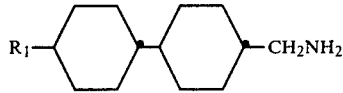

Formula 11

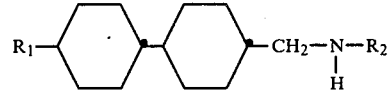

Formula 12

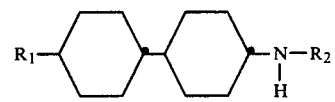

Formula 13 where $R_1$ is an alkyl or alkoxy group having 1-10 carbon atoms, and where $R_2$ is an alkyl group of 1-10 cabon atoms. Generally, R is selected so that the compounds of formulas 5-13 are liquid crystal slightly below, at, or slightly above room temperature. For example, Formula 5 with $R_1=C_5$ exhibits a smectic phase on cooling between 9° and 0°. (All temperatures centigrade.) Formula 5 with $R_1=C_7$ exhibits a smectic phase between 15° and 26°. Formula 6 with $R_1=C_7$ and $R_2=C_1$ exhibits a nematic phase between $-1°$ and 2°. Formula 8 with $R_1=C_5$ exhibits a smectic phase on cooling between 63° and 56°. Formula 10 with $R_1=C_5$ and $R_2=C_4$ exhibits a smectic phase between 45° and 78°. In general, electro-optical devices are preferably operated from below room temperature to somewhat elevated temperatures, for example, $-5°$ to $+100°$. Thus, it has been found that many compounds of formulas 5-13, where $R_1$ and $R_2$ are lower alkyls, satisfy this criteria.

It has also been found that mixtures of appropriate composition of compounds of the formulas 5-13 with liquid crystal compounds of the formulas p-(trans-4-n-alkyl-(or alkoxy-)cyclohexyl) benzonitrile (Formula 14) or 4-n-alkyl-(or alkoxy-)-4'-cyanobiphenyl (Formula 15) produce eutectics having substantially lower, higher or broadened effective nematic temperature ranges than would be expected.

Formula 14

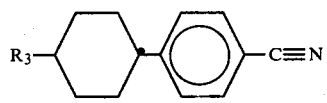

Formula 15

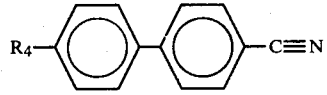

($R_3$ and $R_4$ are alkyl or alkoxy groups having 1-10 carbon atoms.)

For example, a composition consisting of 14% by weight Formula 5 ($R_1=C_5$) in a commercially available eutectic mixture of Formula 14 ($R_3=C_3$, $C_5$ and $C_7$) had a nematic range from below $-30°$ to 64°. The commercial eutectic was nematic between $-6°$ and 70°.

Also, a composition consisting of 4% by weight Formula 10 ($R_1=C_5$, $R_2=C_4$) in Formula 15 ($R_4=C_5$) showed a nematic phase between 12° and 39°. Formula 15 ($R_4=C_5$) showed a nematic phase between 24° and 35°.

It has also been shown that the non-liquid crystalline p-(trans-4-n-alkyl-(or alkoxy-)cyclohexyl) anilines (Formula 16) when mixed in appropriate composition with Formulas 14 or 15 exhibit widened nematic phases.

Formula 16

($R_3$ as above.)

For example, at compositions of 3-25 weight % Formula 16, ($R_3=C_3$) in Formula 14 ($R_3=C_5$), both lowered crystal to nematic and elevated nematic to isotropic points are observed.

Synthesis

Compounds of this invention have been prepared by the following procedures.

Compounds of Formulas 5 and 8 have been prepared by reduction of commercially available compounds of Formulas 14 and 15 with lithium aluminum hydride (LAH). Formula 16 compounds were prepared by the sequence shown below, from Formula 14.

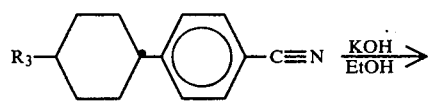

Formula 14

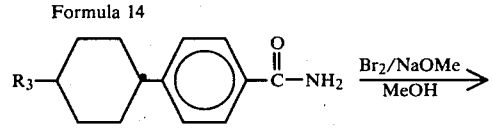

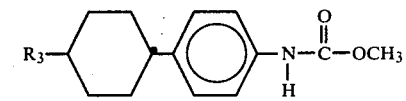

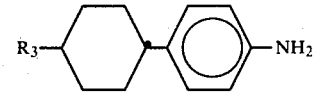

Formula 16

Formula 10 compound may be prepared from Formula 15 compound by the following sequence.

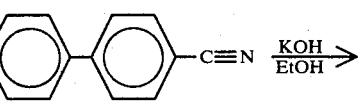

Formula 15

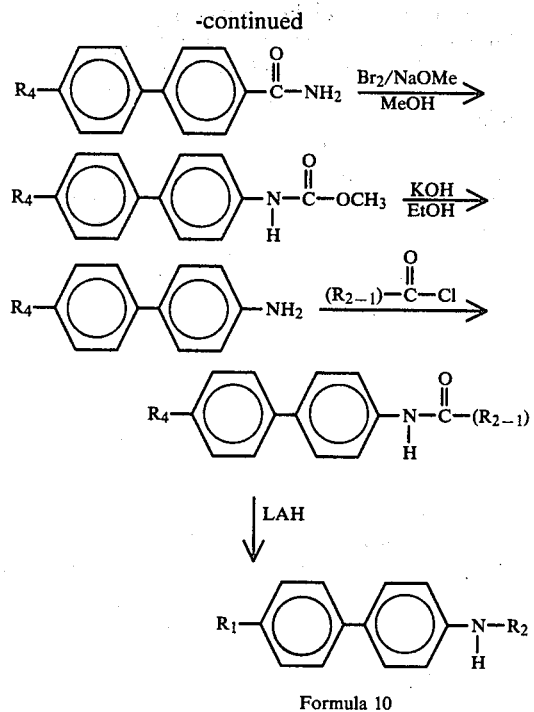

Formula 10 where all R's are alkyl or alkoxy groups containing 1–10 carbon atoms, with the exception of $R_2$ which are alkyl groups of 1–10 carbon atoms. In the reactions involving an alkyl chloride, the designation $R_2$-1 for the alkyl group is used to indicate that 1 less carbon atom exists in this alkyl chain than in the $R_2$ group resulting from the LAH reduction. Formulas 6 and 9 may be prepared from Formulas 5 and 8 by the following sequence:

Formula 8 Or Formula 5 → Formula 9 Or Formula 6

The following examples are given by way of further illustration of the present invention and are not intended to limit the scope of the present invention beyond that of the subjoined claims. All parts and percentages are parts and percentages by weight, not volume, unless otherwise noted.

EXAMPLE 1 p-(4-trans-n-Pentylcyclohexyl)benzylamine (Formula 5, $R_1 = C_5$)

A 100 ml oven dried three neck flask was charged under nitrogen with 1.0 g (4 mmol) of the nitrile precursor, 50 ml of dry diethyl ether and 1.0 g (26 mmol) of LAH. The solution was stirred overnight under nitrogen, after which the excess LAH was decomposed by cautious addition of water until a white precipitate formed. The precipitate was filtered off and the filtrate dried over sodium sulfate. The ether was distilled off and the liquid residue vacuum distilled yielding ~800 mg (80%) of the benzylamine, B.P. ~135° (0.1 mm) K-I, 27°, I.R. (cm$^{-1}$) 3300, 3250, 3010, 2900, 1600.

Cooling: Phase transitions: I-S (isotropic to smectic) 9°, S-K (smectic-crystalline solid) 0°.

Anal. Calc. for $C_{18}H_{29}N$: C, 83.32, H, 11.27, N, 5.40; C, 83.22, H, 11.40, N, 5.46.

Hydrochloride Salt, Calc. for $C_{18}H_{30}NCl$: C, 73.06, H, 10.22, N, 4.73; Found: C, 73.18, H, 10.20, N, 4.76.

EXAMPLE 2 p-(trans-4-n-Pentylcyclohexyl)benzamide

A 3.09 g (12 mmol) sample of Formula 14, $R_3 = C_5$ was refluxed overnight with 4.0 g (70 mmol) of potassium hydroxide in 60 ml ethanol with 20 ml water. The copious white precipitate was suction collected and air dried. Yield, 2.9 g (88%); m.p. 234°–5°; I.R. (cm$^{-1}$) 3300, 3010, 2970, 2950, 1640.

Anal. Calc. for $C_{18}H_{27}NO$: C, 79.06, H, 9.96, N, 5.12; Found: C, 79.36, H, 10.04, N, 5.07.

Methyl-p-(trans-4-n-pentylcyclohexyl)phenylcarbamate

A 1 liter flask with condenser and drying tube was charged with 400 ml dry methanol. Sodium chunks (~4 g, 0.16 mol) were added and the solution stirred until the sodium had dissolved. The solution was cooled to room temperature and 1.5 g (5.5 mmol) of amide was added. To the resulting slurry bromine (~2 ml) was added with rapid stirring. The bromine instantly decolorized, the amide dissolved, and a mild exotherm ensued. The solution was gently warmed for 4 hours and the methanol removed. The residue was stirred with 200 ml of water and the precipitated solid suction collected. Yield, crude carbamate 1.6 g (94%), m.p. 105°–10°. Recrystallization from methanol gave 1.3 g of pure material m.p. 111°–112°; I.R. (cm$^{-1}$) 3250, 2950, 1700, 1590.

Anal. Calc. for $C_{19}H_{29}NO_2$: C, 75.20, H, 9.63, N, 4.62; Found: C, 75.15, H, 9.83, N, 4.67.

p-(trans-4-n-Heptylcyclohexyl)aniline (Formula 16, $R_3 = C_7$)

A 0.512 g (1.55 mmol) sample of the carbamate was refluxed in 20% aqueous ethanol (40 ml) with potassium hydroxide (10 g) under nitrogen. After 24 hours the ethanol was removed and the residue taken up in 50 ml of water. The solution was extracted with three 10 ml ether portions and the combined extracts dried over sodium sulfate. The ether was removed and the residue vacuum distilled yielding 0.348 g (82%) of liquid which solidified on standing. B.P. ~140° (0.1 mm), m.p. K-I 55.8°; I.R. (cm$^{-1}$) 3420, 3350, 3250, 3050, 2950, 1630.

Anal. Calc. for $C_{19}H_{31}N$: C, 83.45, H, 11.43, N, 5.12; Found: C, 83.76, H, 11.18, N, 5.09.

The foregoing examples demonstrate typical characteristics and methods of synthesis of compositions of the present invention. To the extent alkyls up to $C_{10}$ and alkoxies have not been specifically exemplified, their characteristics are postulated from knowledge of other similar liquid crystal systems and the analogous behaviors of similarly substituted alkyls and alkoxies therein.

We claim:

1. A liquid crystalline composition comprising at least two liquid crystalline compounds including one or more liquid crystal compounds from the group consisting of:

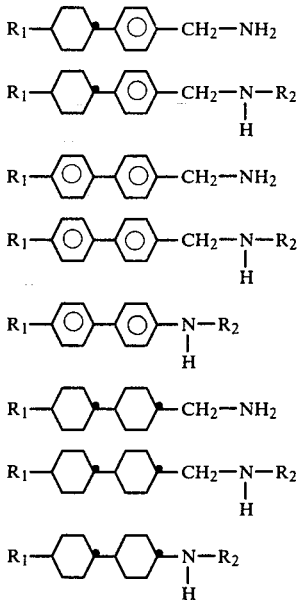

Formula 5

Formula 6

Formula 8

Formula 9

Formula 10

Formula 11

Formula 12

Formula 13 where $R_1$ is an alkyl or alkoxy group having 1-10 carbon atoms, and where $R_2$ is an alkyl group of 1-10 carbon atoms.

2. A liquid crystalline composition comprising a miscible mixture of a first liquid crystal compound as recited in claim 1 and a second liquid crystal compound from the group consisting of p-(trans-4-n-alkyl-(or alkoxy-)cyclohexyl) benzonitriles, the alkyl and alkoxy groups having 1-10 carbon atoms, (Formula 14) and 4-n-alkyl-(or alkoxy-)-4'-cyanobiphenyls, the alkyl and alkoxy groups having 1-10 carbon atoms (Formula 15).

3. A liquid crystalline composition as recited in claim 2 in which the first liquid crystalline compound is present in an amount sufficient to broaden the mesogenic range of the second nematic liquid crystal compound.

4. A liquid crystalline composition as recited in claim 3 in which the first liquid crystal compound consists of p-(trans-4-n-alkyl-(or alkoxy-)cyclohexyl) benzylamine, the alkyl and alkoxy groups having 1-10 carbon atoms (Formula 5).

5. A liquid crystalline composition as recited in claim 3 in which the first liquid crystal compound consists of N-alkyl-p-(4-n-alkyl-(or alkoxy-)cyclohexyl) benzylamine, the alkyl or alkoxy groups having 1-10 carbon atoms (Formula 6).

6. A liquid crystalline composition as recited in claim 3 in which the first liquid crystal compound consists of 4-n-alkyl-(or alkoxy-)-4'-biphenylmethanamine, the alkyl or alkoxy groups having 1-10 carbon atoms (Formula 8).

7. A liquid crystalline composition as recited in claim 3 in which the first liquid crystal compound consists of N-alkyl-4-n-alkyl-(or alkoxy-)-4'-biphenylmethanamine, the alkyl or alkoxy groups having 1-10 carbon atoms (Formula 9).

8. A liquid crystalline composition as recited in claim 3 in which the first liquid crystal compound consists of N-alkyl-4-n-alkyl-(or alkoxy-)-4'-biphenylamine the alkyl or alkoxy groups having 1-10 carbon atoms (Formula 10).

9. A liquid crystalline composition as recited in claim 3 in which the first liquid crystal compound consists of 4-n-alkyl-(or alkoxy-)-trans,trans-4'-bicyclohexyl methanamine, the alkyl or alkoxy groups having 1-10 carbon atoms (Formula 11).

10. A liquid crystalline composition as recited in claim 3 in which the first liquid crystal compound consists of N-alkyl-4-n-alkyl-(or alkoxy-)-trans, trans-4'-bicyclohexyl methanamine, the alkyl or alkoxy groups having 1-10 carbon atoms (Formula 12).

11. A liquid crystalline composition as recited in claim 3 in which the first liquid crystal compound consists of N-alkyl-4-n-alkyl-(or alkoxy-)-trans, trans-4'-bicyclohexyl amine, the alkyl or alkoxy groups having 1-10 carbon atoms (Formula 13).

12. A liquid crystalline composition consisting of a miscible mixture of:
  (a) A first material consisting of p-(trans-4-n-alkyl(or alkoxy-)cyclohexyl) aniline (Formula 16); and
  (b) A second liquid crystalline material consisting of p-(trans-4-n-alkyl-(or alkoxy-)cyclohexyl) benzonitrile, the alkyl or alkoxy groups having 1-10 carbon atoms (Formula 14) or 4-n-alkyl-(or alkoxy-)-4'-cyanobiphenyls (Formula 15), the first material being present in an amount sufficient to broaden the mesogenic range of the second liquid crystalline material.

13. A liquid crystalline composition consisting of a miscible mixture of:
  (a) A first liquid crystalline material consisting of p-(trans-4-n-alkyl-(or alkoxy-)cyclohexyl) benzylamine (Formula 5); and
  (b) A second liquid crystalline material consisting of a eutectic mixture of p-(trans-4-n-alkyl-(or alkoxy-)cyclohexyl) benzonitriles, the alkyl or alkoxy groups having 1-10 carbon atoms (Formula 14), the first liquid crystalline material being present in an amount sufficient to broaden the mesogenic range of the second liquid crystalline material.

14. An electro-optical device comprising two electrodes, one of which is transparent and between which is disposed a nematic liquid crystal film wherein said nematic liquid crystal film is adapted to be subjected to an electric field to cause rearrangement of the nematic liquid crystal orientation, and wherein also said nematic liquid crystal film is composed of a composition recited in any one of claims 1 to 5 and 7 to 14.

* * * * *

UNITED STATES PATENT AND TRADEMARK OFFICE
CERTIFICATE OF CORRECTION

PATENT NO. : 4,293,193

DATED : October 6, 1981

INVENTOR(S) : Mortimer M. Labes et al

It is certified that error appears in the above—identified patent and that said Letters Patent is hereby corrected as shown below:

Col. 8, line 62, "5 and 7 to 14" should be --13--.

Signed and Sealed this

Second Day of March 1982

[SEAL]

Attest:

GERALD J. MOSSINGHOFF

*Attesting Officer*      *Commissioner of Patents and Trademarks*